May 7, 1968  E. W. YETTER  3,382,352
PROCESS CONTROL APPARATUS WITH VELOCITY PATTERN REPERTORY
Filed April 25, 1963  6 Sheets-Sheet 1

FIG. 1

INVENTOR
EDWARD W. YETTER
BY Harry J. McCauley
ATTORNEY

May 7, 1968     E. W. YETTER     3,382,352
PROCESS CONTROL APPARATUS WITH VELOCITY PATTERN REPERTORY
Filed April 25, 1963     6 Sheets-Sheet 6

FIG. 7

| PROFILE | $E_l$ | $E_r$ | $D$ | $S$ | $M_T$ | $M_E$ |
|---|---|---|---|---|---|---|
| | 0 | 0 | 0 | 0 | 0 | 0 |
| | $+_1$ | $+_1$ | 0 | $+_2$ | 0 | − |
| | $-_1$ | $-_1$ | 0 | $-_2$ | 0 | + |
| | $+_1$ | $-_1$ | $+_2$ | 0 | + | 0 |
| | $-_1$ | $+_1$ | $-_2$ | 0 | − | 0 |
| | $-_1$ | 0 | $-_1$ | $-_1$ | − | + |
| | $-_2$ | $+_1$ | $-_3$ | $-_1$ | − | + |
| | $-_2$ | $-_1$ | $-_1$ | $-_3$ | − | + |
| | $+_1$ | 0 | $+_1$ | $+_1$ | + | − |
| | $+_2$ | $+_1$ | $+_1$ | $+_3$ | + | − |
| | $+_2$ | $-_1$ | $+_3$ | $+_1$ | + | − |
| | 0 | $-_1$ | $+_1$ | $-_1$ | + | + |
| | $+_1$ | $-_2$ | $+_3$ | $-_1$ | + | + |
| | $-_1$ | $-_2$ | $+_1$ | $-_3$ | + | + |
| | 0 | $+_1$ | $-_1$ | $+_1$ | − | − |
| | $-_1$ | $-_2$ | $+_1$ | $-_3$ | + | + |
| | 0 | $+_1$ | $-_1$ | $+_1$ | − | − |
| | $+_1$ | $+_2$ | $-_1$ | $+_3$ | − | − |
| | $-_1$ | $+_2$ | $-_3$ | $+_1$ | − | − |

$E_l = S_l - B_l$ $E_r = S_r - B_r$ $D = E_l - E_r$
$\phantom{D} = S_l + B_r - S_r - B_l$ $S = E_l + E_r$
$\phantom{S} = S_l + S_r - B_l - B_r$ $M_T$ = TRAVERSE MOTOR
+ = RIGHT    − = LEFT
$M_E$ = EXPANSION MOTOR
+ = EXPAND    − = CONTRACT

INVENTOR
EDWARD W. YETTER

*Harry J. McCauley*

BY     ATTORNEY

United States Patent Office 3,382,352
Patented May 7, 1968

---

3,382,352
PROCESS CONTROL APPARATUS WITH VELOCITY PATTERN REPERTORY
Edward W. Yetter, West Chester, Pa., assignor to E. I. du Pont de Nemours and Company, Wilmington, Del., a corporation of Delaware
Filed Apr. 25, 1963, Ser. No. 275,651
6 Claims. (Cl. 235—151.1)

ABSTRACT OF THE DISCLOSURE

Apparatus for process control utilizing the sampled data approach and the computation of a plurality of parameters characterizing the process which is to be controlled, thereby permitting selection of appropriate velocity patterns from a repertory of available velocity patterns applicable to jointly effective power-driven apparatus operative on the process.

---

This invention is an improvement on the 'Control Method and Apparatus" taught in my copending U.S. patent application Ser. No. 108,521, filed May 8, 1961, now issued as U.S. Patent 3,201,572, in the sense that it goes considerably beyond the earlier invention in the application of the principle of velocity pattern control to complex manufacturing processes, and, particularly, to those characterized by a plurailty of interrelated parameters.

An object of this invention is to provide an improved apparatus for process control which is low in first cost as well as maintenance of equipment, dependable in operation and capable of the control of complex manufacturing processes which have not hitherto been controllable to high precision by automatic control equipment. The following description is directed to the control of a textile yarn beaming operation as an apt example of manufacturing processes to which my invention is particularly applicable, it being understood that no restriction to any one, or even several other fields, is thereby implied. Accordingly, the detailed description is supplemented by the following drawings, in which:

FIG. 1 is a block diagram of a preferred embodiment of apparatus according to this invention adapted to yarn beaming control by automatic regulation of selvage edge buildup through the agency of apparatus taught in copending U.S. patent application Serial No. 75,755, now issued as U.S. Patent 3,174,207, filed of even date herewith, FIGS. 2–5, inclusive, detailing the modes of operation of various apparatus components denoted in FIG. 1, as to which

Generally, this invention consists of a sampled data method of control of a process through the agency of jointly effective power-driven apparatus units operative on the process comprising in sequence during a sampling-computing interval of time, sensing individually a plurality of variables, computing as a conjoint function of these variables a plurality of parameters characterizing the process, choosing a process corrective action on the basis of the established value of a specific one of the plurality of parameters in terms of a velocity pattern applicable to a specific one of the power-driven apparatus units operative in conjunction with at least one other velocity pattern similarly chosen closest to obtain the desired control response within a predetermined time span consummated prior to the end of the next succeeding sampling-computing interval, and effectuating control of the process by application of each said velocity pattern to said specific one of said power-driven apparatus units to which it relates, together with apparatus for carrying out the method.

The beaming of textile yarn is an operation involving the closely abutting, side-by-side, high speed winding of a multiplicity (typically 1500 in number) of individual running lengths of textile yarn on a large spool to make up a large diameter yarn package which is marketed as such to knitters and other yarn converters.

As fully explained in U.S. patent application Ser. No. 275,755, now issued as U.S. Patent 3,174,207 hereinbefore mentioned, it has been found that yarn laydown on the beaming spool can be controlled to give a predetermined and positionally stable profile of beam by: (1) expanding or contracting the yarn warp sheet width just prior to feed of the yarn to the beam, and (2) by appropriately shifting the warp sheet laterally by means such as an adjustable comb or a positionable fan reed conventional in the textile beaming art. Since yarn supply velocity is dependent upon yarn laydown on the beam, the sensed variable upon which control can be based in yarn beaming can be yarn supply velocity. Moreover, since beam profile is generally non-uniform, in the sense that selvage yarn (by which is meant that yarn wound on the very ends of the beam adjacent the spool flanges) behaves differently than body yarn (by which is meant all yarn other than selvage yarn), it is necessary to correlate the laydown of selvage and body yarn, and this is conveniently achieved through error signals, which are defined as follows:

If $S_1$ and $B_1$, respectively, are representative of the yarn supply velocities for a given selvage yarn and a body yarn in close proximity therewith (typically 4" from, i.e., within about 100 yarn ends for fine denier, e.g., 30-denier yarn, laid down from the left-hand spool flange) and, if $S_r$ and $B_r$ are the corresponding variables for the opposite end of the beam, the error signals $E_1$ and $E_r$ can be derived, i.e., $$E_1 = S_1 - B_1 \text{ and } E_r = S_r - B_r$$

(As a convenience in reference, although purely arbitrary in the designation, the selvage and body yarns with the "*l*" subscripts can be thought of as the left-hand ones, whereas those with the "*r*" subscripts can be thought of as right-hand, so long as each is viewed consistently, although at will, from either the yarn input or the opposite side of the beam.)

It is not practicable, however, to base process control upon these error signals solely, because the two yarn windups are interdependent. Accordingly, certain parameters characteristic of the operation must be established and these, for yarn beaming, turn out to be a sum parameter, hereinafter abbreviated S, such that $S = E_1 + E_r$ and a difference parameter, abbreviated D, such that $D = E_1 - E_r$.

Figure 1:
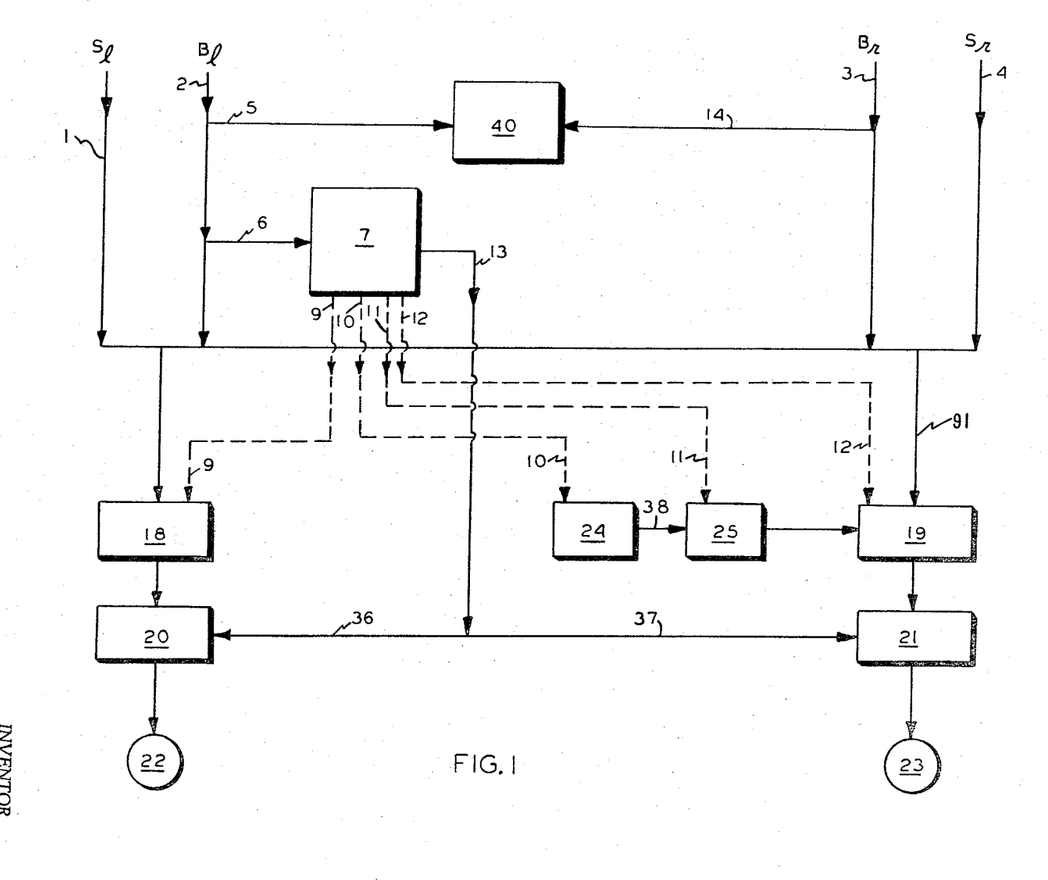

Referring to FIG. 1, which is a block diagram depicting the effective control channels (as distinguished from electrical circuitry) of a preferred embodiment of beaming control apparatus according to this invention, the channels drawn in broken line representation are those reserved to sequence control signals, whereas all solid lines denote information channels. As will become more evident as the description proceeds, the basic arrangement of apparatus, exclusive of the optional programming control hereinafter described, is completely symmetrical, as regards the control provision for each of the two pulse-operated stepping motors 22 and 23, the former of which is arbitrarily reserved to transverse shifting of the yarn warp sheet (not shown) whereas the latter is reserved to expanding or contracting the yarn warp sheet width. Thus, motors 22 and 23 constitute the "power-driven apparatus units" of the claims operative on the beaming process which it is desired to control. Similarly, components 18 and 19 are each registers which individually compute (and hold in memory) a single one of the parameters hereinbefore mentioned, register 18 being reserved in this instance to difference parameter D, whereas register 19 is reserved to sum parameter S. Finally, components 20 and 21 are logic network selectors which individually choose a corrective action on the basis of the respective parameters computed within registers 18 and 19, in terms of an appropriate velocity pattern adapted to the control sought, and thereafter apply the selected velocity pattern to the specific motor 22 or 23 to which it relates.

It is convenient, although not necessary, to employ digital computation to effect the control of this invention, and this system is described for the detailed embodiment, which, therefore, enables the utilization of conventional logic circuitry inclusive of the usual AND and OR gates, flip-flops and associated gear. Control is achieved according to repetitive time cycles wherein the control parameters are established during a sampling-computing interval of time and the selected velocity patterns obtained are applied to the powered units operative on the process for other preselected intervals of time, which can, optionally, partially overlap, or follow, the full sampling-computing interval, depending upon the requirements of the process being controlled.

It will be understood that the designer has broad freedom as regards the inter-relationship of data sampling and computations based thereon in the practice of this invention. Thus, sampling and computation can be conducted substantially concurrently, as is the situation for the yarn beaming example herein detailed, or computation may follow in time the data sampling upon which it is based. The latter situation can particularly occur where an analog signal is sensed, thereafter digitized and finally, employed as the basis for a computation. Also, in some instances, it can be desirable to conduct one computation simultaneously with data sampling and another independent, or inter-related one, after data sampling is completed, so that a combination concurrent and sequential operation then obtains. For generality, then, this part of the control cycle is designated simply as the data sampling-computing interval, or, briefly, as the "Sampling Period," with no restriction on the order in which sampling and computing occur being implied other than that the computing is always based on the sampling.

The yarn supply velocity measures $S_l$, $S_r$, $B_l$ and $B_r$ are all conveniently measured continuously by periodic electrical pulse generation, as taught in U.S. patent application Ser. No. 275,755, now issued as U.S. Patent 3,174,207, a typical transducer constituting a pulley wheel frictionally driven by the particular running yarn, which wheel, by optical sensing, magnetic interaction, or other conventional method, generates an electrical pulse during each revolution (or any given fraction of a revolution), which pulses are then fed to the apparatus via signal lines 1–4, inclusive, corresponding to $S_l$, $B_l$, $B_r$ and $S_r$, respectively. As is customary in the art, it is desirable to convert the raw pulses received from the transducers to a train which has quite precise width, rise times and amplitudes (typically, a width of 0.25 μsec. max., with pulses spaced a minimum of 0.5 μsec. apart, is satisfactory) and, thus, standard pulse-forming circuits, not shown, are interposed between the transducers and signals lines 1–4.

Figure 3:
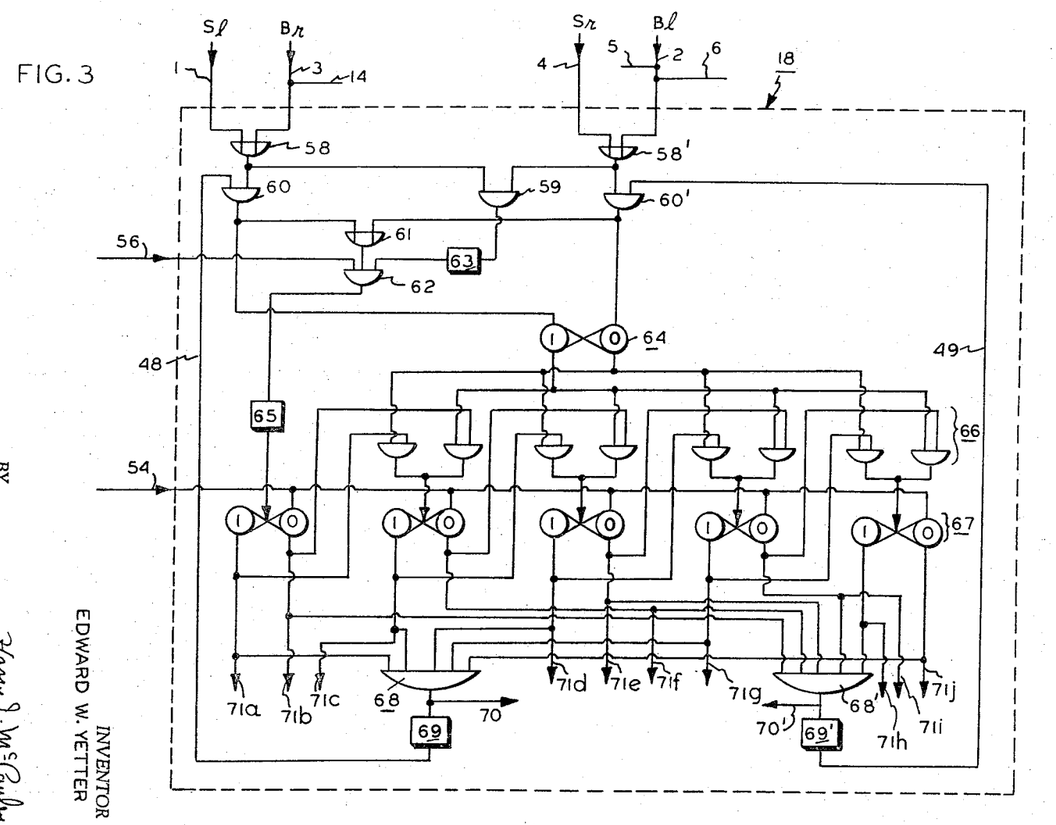
FIG. 3 is a logic diagram of a single one of the registers.

With the pulse widths and spacing reported, it is practicable to feed the sensed variables' pulses via lines 1 and 3 through the same OR gate 58, FIG. 3 (and those via lines 2 and 4 through the same OR gate 58′) without objectionable coincidence one with another, i.e., any interference occurring is within the noise level of the system as a whole. If greater precision is necessary, a conventional pulse scan with associated memory can be provided; however, this is seldom required, especially if there exists a random time jitter (typically 0.5 μsec. minimum) in the output of the pulse sharpeners, which is normally inherent in the apparatus noise level anyway. The control cycle in the case of beaming control can be predicated at will on any one of the four signal inputs (although a body yarn velocity is preferred), and the $B_l$ signal input is arbitrarily employed in FIG. 1 for this purpose. Thus, a bypass pulse input is withdrawn from signal line 2 via line 6, which latter furnishes the primary pulse input to master pulse counter 7. As will be later described in detail, the individual velocity patterns applied to control motors 22 and 23 can be conveniently drawn from master pulse counter 7, and this fact is indicated by line 13, which can be considered to be a cable including, collectively, lines 42–45, hereinafter described, which cable is branched, as indicated at 36 and 37, to power each of the motors individually through their respective logic network selectors and associated gear. As previously mentioned, the sequence control signal outputs from counter 7 are applied to the individual registers via channels 9 and 12, respectively, whereas channels 10 and 11 are reserved for the controlled sequencing of certain auxiliary programming apparatus hereinafter described.

Figure 2:
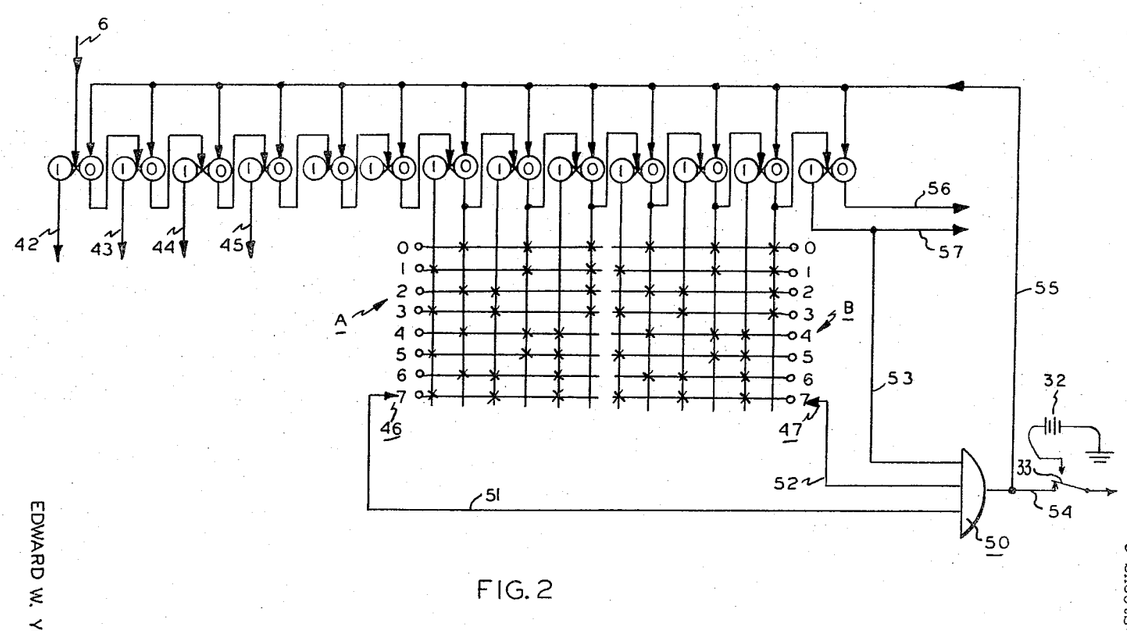
FIG. 2 is a partial logic diagram of the master counter.

Master pulse counter 7 consists, as shown in FIG. 2, of a $2^{12}$ (13 bits) binary counter made up of conventional flip-flops, the "1" and "0" states of which are denoted for the paired sides. Pulse outputs corresponding $2^0$, $2^1$, $2^2$ and $2^3$ counts are delivered via lines 42, 43, 44 and 45, respectively, to the logic network selectors hereinafter described with reference to FIG. 4. The flip-flops corresponding to the count stages $2^6$ through $2^8$ are connected on both sides as inputs to a diode matrix, denoted generally at A, which is provided with an octal, manually-operated thumb switch 46. Stages $2^9$ through $2^{11}$ are similarly connected as inputs to an identical diode matrix B, provided with its own thumb switch 47, identical with switch 46. The continuous signal outputs from matrices A and B are withdrawn via lines 51 and 52, respectively, and ANDED in AND gate 50, to which is also supplied the cycle termination signal for the sampling-computing interval from the "1" side of the $2^{12}$ stage via lines 57 and 53. The output from gate 50 is employed as a reset signal for all stages of the master counter, via line 55, and is also passed to each of the registers 18 and 19 via a line 54, a typical one, e.g., register 18, of which is detailed in FIG. 3.

To permit operator reset of counters to zero prior to start-up of beaming operation, a standby D-C source 32 of voltage matching the system logic level (typically 6 v.) is connected between ground and the upper contact of a double-throw, single-pole switch 33, normally closed on its lower contact in circuit with line 54.

Referring to FIG. 3, the input routes of the sensed variables, which in this case are pulse-transduced $S_l$, $B_l$, $S_r$ and $B_r$, are shown in more elaborate representation than in the block diagram of FIG. 1. Since the variables $S_l$ and $B_r$ on the one hand, and $S_r$ and $B_l$ on the other are utilized, in this instance, as pairs, arrangement of signal lines 1–4 is transposed over that shown in FIG. 1 to facilitate the showing. OR gate 58 is used to introduce the inputs, $S_l$ and $B_r$ received from lines 1 and 3, respectively, whereas OR gate 58' is used to introduce the inputs $B_1$ and $S_r$ received from lines 2 and 4, respectively. The outputs of the two OR gates are ANDED, collectively, via AND gate 59, and ANDED individually, via gates 60 and 60', with overflow-inhibit signal lines 48 and 49 delivering the output of complementers 69 and 69', hereinafter described. These complementers are of the usual design serving, in effect, as logic inverters, since receipt of a specific input, such as a "1," for example, results in delivery of a "0" output, and vice versa.

The output of AND gate 59 is delivered to complementer 63, and the output therefrom passes to AND gate 62 receiving, as additional inputs, the continuous D-C signal from line 56, connecting with the "0" state side of the $2^{12}$ flip-flop of master counter 7, as well as pulse signals from OR gate 61, in turn receiving its inputs from the output sides of AND gates 60 and 60'. The individual outputs of gates 60 and 60' are also delivered to the "1" and "0" sides, respectively, of flip-flop 64 (effective to set the direction of the count), whereas the ANDED output of gate 62 goes to time delay 65 and thence to the input of the five-stage (4 bits+and sign bit, forward-backward type) counter of register 18, the flip-flops of which are denoted generally at 67. The time delay provided by component 65 is brief (i.e., of the order 0.5–1.0 microsec.) and need only be sufficient to enable flip-flop 64 and its associated response AND gates 66 ample time to complete a reverse operation, as this from time to time occurs.

The "0" input sides of all of the flip-flops 67 are connected to line 54 delivering the master counter output signal from AND gate 50 (refer FIG. 2), whereas the "0" outputs are individually ANDED with the "1" side outputs of flip-flop 64 via the AND gates denoted collectively at 66. Similarly, the "1" side outputs of counter 67 are ANDED individually with the "0" outputs of flip-flop 64 by other gates 66, and the manifolded output of adjacent gates delivered, in sequence from left to right, as inputs to the next-succeeding flip-flops 67. The extreme right-hand flip-flop 67 is reserved to algebraic sign designation. The velocity pattern selection signals are delivered through lines 71a–71j, inclusive, and thus constitute inputs for the logic network selectors, one of which is detailed in FIG. 4. At the same time, the "1" sides of all flip-flops 67 except the last, and, as to this, the "0" side, are ANDED together at AND gate 68, whereas the "0" sides of these same stages ("1" side of the last stage) are ANDED together at AND gate 68'. Lines 70 and 70' on the output sides of gates 68 and 68', respectively, go to visual or audible alarms signalling plus and minus data overflow contingencies, respectively, as later described.

Figure 4:
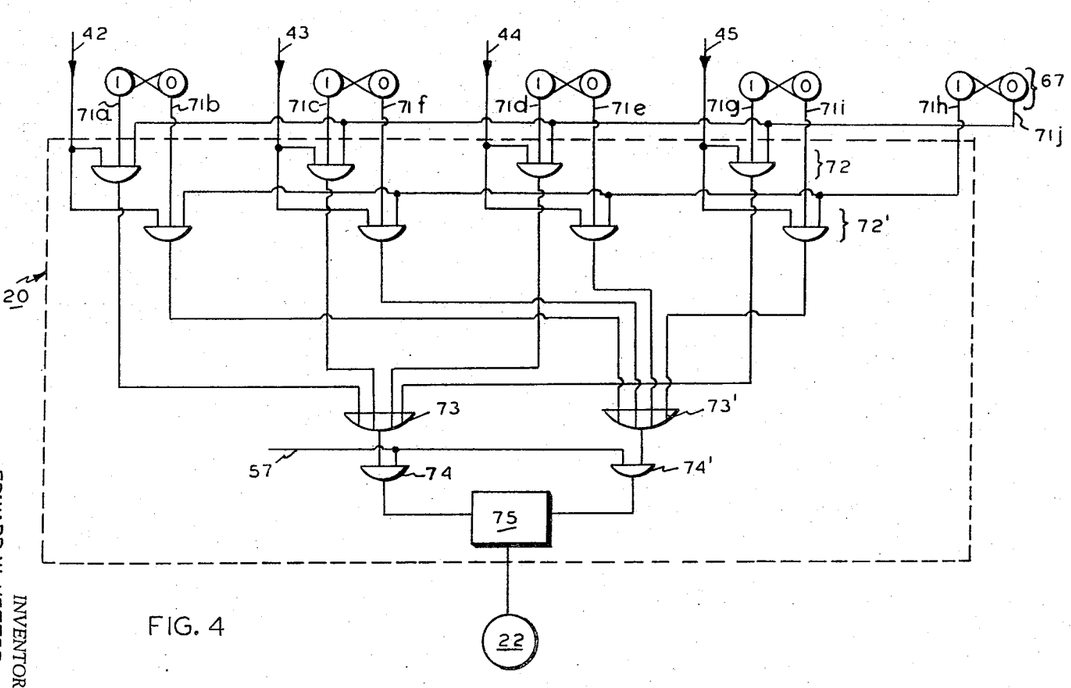
FIG. 4 is a logic diagram of a single one of the logic network selectors shown in connection with its related control motor circuit.

Referring to FIG. 4, the flip-flops 67 are repeated in showing as regards connection with the logic network selector 20 (FIG. 1), the remaining details already described with reference to FIG. 3 being omitted.

Thus, all "1" sides of the flip-flops 67, except the extreme right-hand one, i.e., the $2^4$ stage, are individually ANDED via AND gates 72 with their respective associated master counter output lines 42, 43, 44 and 45, and also with the "0" side of the $2^4$ stage flip-flop. Similarly, the "0" sides of all stages except the $2^4$ stage, and the "1" side of the latter, are ANDED with lines 42, 43, 44 and 45, respectively, via AND gates 72'. The outputs of gates 72 are manifolded through OR gate 73, and the outputs of gates 72' are similarly manifolded through OR gate 73'. Finally, the outputs of each of the latter are individually ANDED by AND gates 74 and 74' with output line 57 running from the "1" side of the $2^{12}$ stage of master pulse counter 7, and each passed as one of the two distinctive inputs to motor translator 75, which thereafter applies the appropriate selected velocity pattern in one direction or the other to stepping motor 22. Motor translator 75 is a conventional design (e.g., a "Slo-Syn" type, adapted for use with the Superior Electric Company's "Slo-Syn" motor) which performs a power amplification function and, at the same time, converts the signal level logic pulses to an input sequence suited to the particular motor design, so that one step on the motor always corresponds with the single input control pulse.

Figures 5, 6:
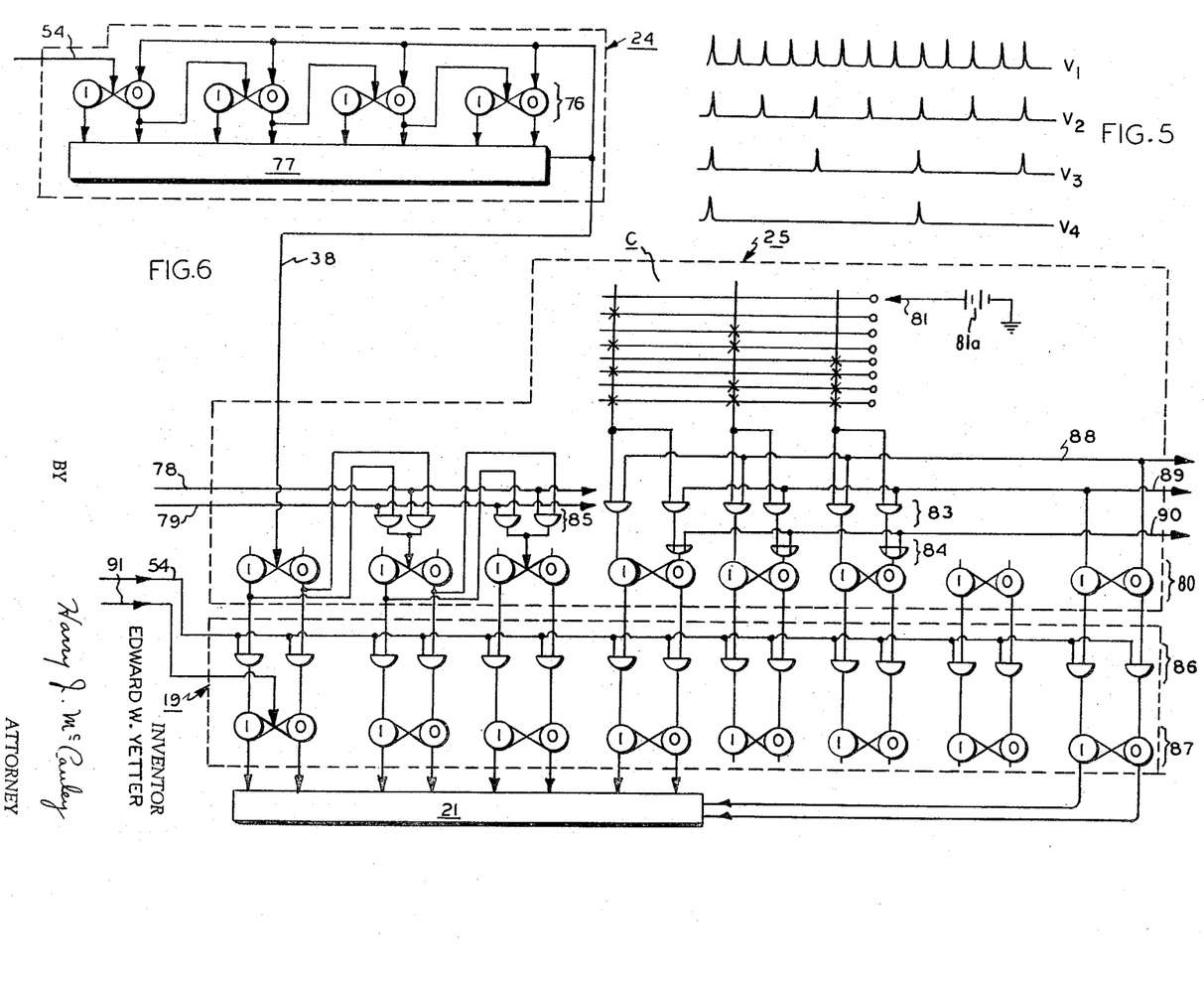
FIG. 5 is a schematic representation of four typical control motor speed signal pulse forms usable for control according to this invention.
FIG. 6 is a partial logic diagram of another type of register circuit especially adapted to use with associated bias register and bias advance counter circuits.

In the yarn beaming embodiment of this invention hereinbefore detailed, only four velocity patterns were necessary for the purposes, and these are denoted by the pulse traces $V_1$, $V_2$, $V_3$ and $V_4$ of FIG. 5. The velocity patterns $V_1$–$V_4$ have the pulse frequency relationship 8:4:2:1, in the order recited, at any given yarn speed, and, of course, are adapted to effect clock-wise and counter-clockwise driving of the motors 22 or 23, depending on which side the pulse signal is applied to motor translator 75. (Typically, the maximum pulse rate corresponding to $V_1$ was 200 pulses per second, a limitation imposed by the particular design of motors 22 and 23 employed.) The condition of zero velocity is yet another distinctive velocity pattern, completing the repertory. Conveniently, the four velocity patterns, in descending frequency order, are drawn directly from master counter 7 as the outputs of the $2^0$, $2^1$, $2^2$, and $2^3$ stages, respectively, delivered via lines 42, 43, 44 and 45, respectively, as hereinbefore described but can, of course, originate elsewhere, as, for example, from a fixed frequency source.

An additional auxiliary useful in yarn beaming is a beam taper control, indicated generally at 40, FIG. 1. Beam taper control can be effected simultaneously with beam selvage control as hereinbefore described by providing a completely independent control motor (or motors), not shown, but similar to motors 22 and 23, which are driven by velocity pattern selection in a manner identical with that already described to either increase or decrease the pressure applied to a beam in build-up by a body roller bearing on it, or to selectively cant the beam axis by shifting the position of the winding mandrel bearings, or both. In either case, a differential count signal of $E_t = B_r - B_1$ (which, in itself, is the taper parameter upon which this part of the overall control is based) must be developed and this is derived from lines 5 and 14 connecting, respectively, with sensed variable input lines 2 and 3, FIG. 1. Component 40 then includes a forward-backward type counter of typically six bits plus sign capacity, computing the parameter on which the appropriate corrective velocity pattern is chosen.

It will be understood that FIGS. 1–4, inclusive, are schematic and, omitted therefrom for purposes of clarity and simplification, are all details of power supply, manual switches, interlocks, motor 22 and 23 limit switches, alarm circuitry and counter display boards, although these are all necessary or desirable components of an actual installation. Moreover, it is imperative that provision be made for manual over-ride, by which is meant the complete substitution of manual for automatic control at the operator's option whenever that may be necessary, this being conveniently effected by incorporation of a two-position manual-automatic switch for the entire apparatus, plus the incorporation of push button switch-controlled 60 c. A-C actuation inputs connected direct with motors 22 and 23.

It will be further understood that FIGS. 3 and 4 relate solely to the control effected through the left-hand apparatus depicted in FIG. 1. Counterpart components are, of course, provided in the right-hand side, except that register 19 preferably includes a somewhat larger capacity counter (typically, 7 bits plus sign, forward-backward type) for reasons hereinafter elaborated.

Functionally, diode matrices A and B (FIG. 2) constitute loop gain-control facilities and, since the nature of the yarn beaming process demanded considerable flexibility in operator choice in this regard, provision was made in the wiring and switching for sixty-four different time spans spaced at equal increments, one from its neighbors, from the count of 4096 to 8191 of master counter 7. It will be understood that gain control is, in general, optional, although, usually, a highly desirable auxiliary, and, as such, is not an essential part of this invention. However, when it is used, the gain-control can conveniently be integrated with master pulse counter 7 in the circuit form hereinbefore described making it then independent of absolute yarn velocity. It will be understood, however, that the system gain as a whole is independent of yarn velocity only when the velocity patterns are derived from the master counter together with the gain control.

Although beam contour can be varied widely, depending on customer preferences, the usual operation of this invention entails the wind-on of the selvage yarn in such a manner that the beam diameter at the selvage edge is equal to, or a predetermined proportional amount less than, the diameter of the beam body. This is accomplished through adjustment of the comb or fan guides under the agency of motors 22 and 23, the guides operative on the running selvage yarn being most effective in this respect, whereas those operative on the running body yarn maintain relative spacing of the yarn ends one from another to level the beam build-up over its full length. Since the running speed of the beaming apparatus is variable over the full range, depending upon manufacturing considerations completely unrelated with any apparatus provided for operational control, it is imperative that the control be independent of time and this has been achieved by predicating operation on the sensed yarn throughput entering the beaming apparatus, as hereinbefore described. Under these circumstances, the control obtained is entirely as effective at ⅛-speed, or less, for example, as it is at the beamer full design speed.

Prior to the commencement of beaming, the control apparatus of this invention is readied for operation by momentary closure of switch 33, FIG. 2, upon its upper contact, thereby resetting all counters to zero, after which the switch is restored to its normal position, in closed circuit with the lower contact.

The cycle of operation in the beaming control application consists of (1) a Sampling Period, during which counts are simultaneously accumulated in the two registers 18 and 19, error signals are formed therefrom, and the Sum (S) and Difference (D) parameters hereinbefore mentioned are computed, the former in register 19 and the latter in register 18, and (2) a Correction Period, during which the appropriate velocity patterns are very speedily chosen within logic network selectors 20 and 21, responsive to registers 18 and 19, respectively, and applied to stepping motors 22 and 23 for preselected intervals in terms of yarn throughputs manually chosen by the operator's positioning of switches 46 and 47 with respect to the different levels (Nos. 0–7, inclusive) of diode matrices A and B, respectively.

As previously mentioned, the beaming contour control is of two types: (1) shifting the comb or fan reed as a whole in a given direction (e.g., to the "right," denoted by the positive sign convention in the taubulation of FIG. 7) and in the opposite direction (i.e., to the "left," denoted by the negative sign convention, FIG. 7),which is accomplished by motor 22 (abbreviated $M_T$), based on the D parameter and (2) expanding (positive sign convention) or contracting (negative sign convention) the effective comb teeth spacing relative one another (or by raising or lowering the fan reed) by motor 23 (abbreviated $M_E$), based on the S parameter. The variety of yarn profile corrections which are effected by numerous combinations and magnitudes of error signals $E_l$ and $E_r$, for which the corresponding parameters D and S are tabulated, are reported as transverse ($M_T$) and expansion ($M_E$) motor operations in FIG. 7, together with the associated yarn beam profiles depicted. The first straight-line profile, with zero control application is, of course, an idealized one, assuming, as it does, perefectly precise yarn winding lay-down of perfectly constant diameter yarn, free of all stretching under tension as well as retraction under compression.

As a practical matter, some control must always be imposed to approach this straight-line profile state.

As has already been brought out in the preceding description, the detailed operation of the control apparatus of this invention involves the orderly handling of sensed variable information and the generation and directing of appropriate signals based thereon, culminating in effectuation of a correctional action applicable to the process in control as a terminal consequence of the control cycle.

Timing is under the exclusive control of master counter 7, which operates in the conventional manner of pulse counters known to the art by virtue of successive flip-flop switching to "1" and "0" states cyclically, with progressive pick up of succeeding flip-flops from left to right in FIG. 2 as the counting proceeds. The counter actuation pulses are derived from the body yarn sensing, $B_l$, introduced via line 2 to which the $2^0$ stage of the counter is connected by line 6. A fixed Sampling Period of 4096 counts entails operating master counter 7 until the $2^{12}$ counter, the extreme right-hand one of FIG. 2, is in its "1" state, at which time the Sampling Period is terminated by discontinuance of the constant D-C signal applied from the "0" side via line 56 to AND gate 62 (FIG. 3), shutting off any further signal reception of sensed variables via signal lines 1–4. The elapsed time for this phase of the operation can be quite brief (e.g., 0.25 min., where the yarn speed is about 400 yds./min.). It is possible to obtain zero Correction Period at this instant, if manual switches 46 and 47 are both at zero (uppermost) level of matrices A and B; however, since this is the unusual case, it is assumed that at least one of the switches is, instead, at some other level, for example, Level No. 1, as hereinafter described. (Actually, the zero Correction Period setting is advantageous as a practical matter, particularly during start-up, because the apparatus is then effectively monitoring the beaming operation without the imposition of any control whatever. This permits operator evaluation of the uncontrolled beaming to a much more accurate degree than is possible by mere visual observation, and removes the risk of inadvertent over-adjustment of mechanical settings and the like as regards the beaming apparatus per se, so that the machine can be preliminarily adjusted to optimum state before control is ever imposed. Moreover, in the event that components of the control apparatus ever go out of action for any reason whatever, occasional reversion to the Zero Correction Period level is helpful in verifying this, as by the affording of a check of operation with zero control as compared with operation under ostensible control.)

The Correction Period then commences, during which the $2^{12}$ flip-flop remains in the "1" state while the uninterrupted pulse input via line 6, connected directly to line 2, continues. The counting cycle proceeds through the $2^0$–$2^5$ stages until the $2^6$ stage is reached. From this stage on, the manual setting of switches 46 and 47 with respect to the various levels of matrices A and B, respectively, are effective to terminate the Correction Period at any chosen time 64 counts ipart, starting with Level No. 1 coupled with Level No. 0 for matrices A and B, respectively, which is precisely 64 counts from the end of the Sampling Period in terms of counter stages interposed into the counting cycle after the $2^{12}$ flip-flop has switched to its "1" state. The octal coding design of matrices A and B is particularly advantageous, since binary coding in units of 3 bits is automatically achieved.

As a typical example, if switch 46 is disposed at Level No. 1 of Matrix A and switch 47 is at Level 0, Matrix B, when the $2^6$ counter switches to its "1" state all succeeding flip-flops through the $2^{11}$ stage are in their "0" states, and the coded requirement is therefore achieved for transmission of steady current signals via switch 46 and line 51, and via switch 47 and line 52, to AND gate 50. Since the $2^{12}$ counter has remained in its "1" state, the condition now exists for completing ANDING, and a signal is delivered via line 54 to register 18, which terminates the Correction Period. Simultaneously, a reset signal is delivered via line 55 (FIG. 2) to all stages of master counter 7, resetting them to their "0" states for repetition of the entire cycle.

Turning now to the description of the operation of the registers 18 and 19, FIG. 3, the normal flow of sensed variable pulses is from lines 1–4 through OR gates 58 and 58', and thence to AND gates 60 and 60', to which is constantly applied a signal from complementers 69 and 69', respectively, corresponding to the "1" state of the complementers, confirmatory of no sensed count overflow (either positive or negative) within flip-flops 67 of the counter of register 18. The output of gate 60 then goes to the "1" side of flip-flop 64 and the output of gate 60' goes to the "0" side, so that the directional convention of the count is established, i.e., forward for $S_1B_r$, arbitrarily, and backward for $S_rB_1$. At the same time the counts are passed to the $2^0$ stage flip-flop of the register counter via OR gate 61, AND gate 62, and time delay 65. As hereinbefore described, a signal input via line 56 is continuously applied to gate 62 during the Sampling Period, and a similar signal is applied from complementer 63 at all times except when pulses arrive at the same instant from lines 1 or 3 on the one hand and 2 or 4 on the other, so that an open route is always presented to the input of sensed variable pulses during the entire Sampling Period. Should pulses be delivered at the same instant from gates 58 and 58', they AND in gate 59, switching complementer 63 to its "0" state for the duration of the pulses only, thereby closing gate 62 to the receipt of these pulses. It is, of course, consonant with the control equations defining the parameters that simultaneously pulses cancel in this manner.

Forward-backward operation of the counters of components 18, 19, 25 and 40 is obtained in conventional manner by interposing AND gates ahead of the individual flip-flops in the connections detailed for gates 66 and flip-flops 67, FIG. 3. Under these circumstances, accumulated count, which is, per se, the computed D parameter for register 18 and the S parameter for register 19, are true algebraic sum determinations. It is, of course, possible that beamer operation can become so erratic as to exceed the count capacity of the registers 18 and 19, and this contingency requires prompt intervention on the part of the operator. Overflow inhibition is effected by providing AND gate 68 for positive (i.e., "1" state overcounts) and AND gate 68' for negative (i.e., "0" state overcounts) a level of ±15 counts being a practical design for register 18 whereas the higher level of ±127 counts is practical for register 19, with the additional consideration, for the latter, that the alarm actuation is deferred until the end of the Sampling Period, and then is effective at ±15 counts level. The outputs of AND gates 68 and 68' go to individual alarm signal lines 70 and 70', respectively, and also to individual complementers 69 and 69', which immediately switch to their "0" states upon receipt of an input pulse, thereby terminating the further receipt of pulses from lines 1–4 through AND gates 60 and 60', respectively.

Considering next logic network selector 20, FIG. 4, the verification of a positive count (driving motor 22 rightwards) is accomplished through AND gates 72, whereas the verification of a negative count is through AND gates 72', the four velocity patterns $V_1$–$V_4$ being ANDED with the gates via lines 42–45, respectively. The velocity pattern outputs are, for the positive convention, via OR gate 73, and, for the negative convention, via OR gate 73', and these are correlated with the existence of a Correction Period by ANDING with the "1" state signal set up in the $2^{12}$ flip-flop of master counter 7 via line 57 running to AND gates 74 and 74'. Motor translator 75 finally applies the drive to one side or the other of motor 22.

The following tabulation presents the logic of the selector network 20 (and 21), FIG. 4. It is convenient to select a binary system zero of 0000 for plus convention operation and a zero of 1111 for negative convention operation, under which circumstances it will be apparent that the most significant "1" bit is all the information required for positive velocity pattern control outputs whereas the most significant "0" bit is similarly the only essential for negative outputs.

| Accumulated Count (decimal) | Sign Flip-Flop State | Counter Contents | | Relative Motor Speed |
|---|---|---|---|---|
| 0 | 0 | 0000 | | 0 |
|  | 1 | 1111 | |  |
| ±1 | 0 | 0001 | | $±1≡V_4$ |
|  | 1 | 1110 | |  |
| ±2 to ±3 | 0 | 0010 to 0 | 0011 | $±2≡V_3$ |
|  | 1 | 1101 to 1 | 1100 |  |
| ±4 to ±7 | 0 | 0100 to 0 | 0111 | $±4≡V_2$ |
|  | 1 | 1011 to 1 | 1000 |  |
| ±8 to ±31 | 0 | 1000 to 0 | 1110 | $±8≡V_1$ |
|  | 1 | 0111 to 1 | 0001 |  |

Figure 7:
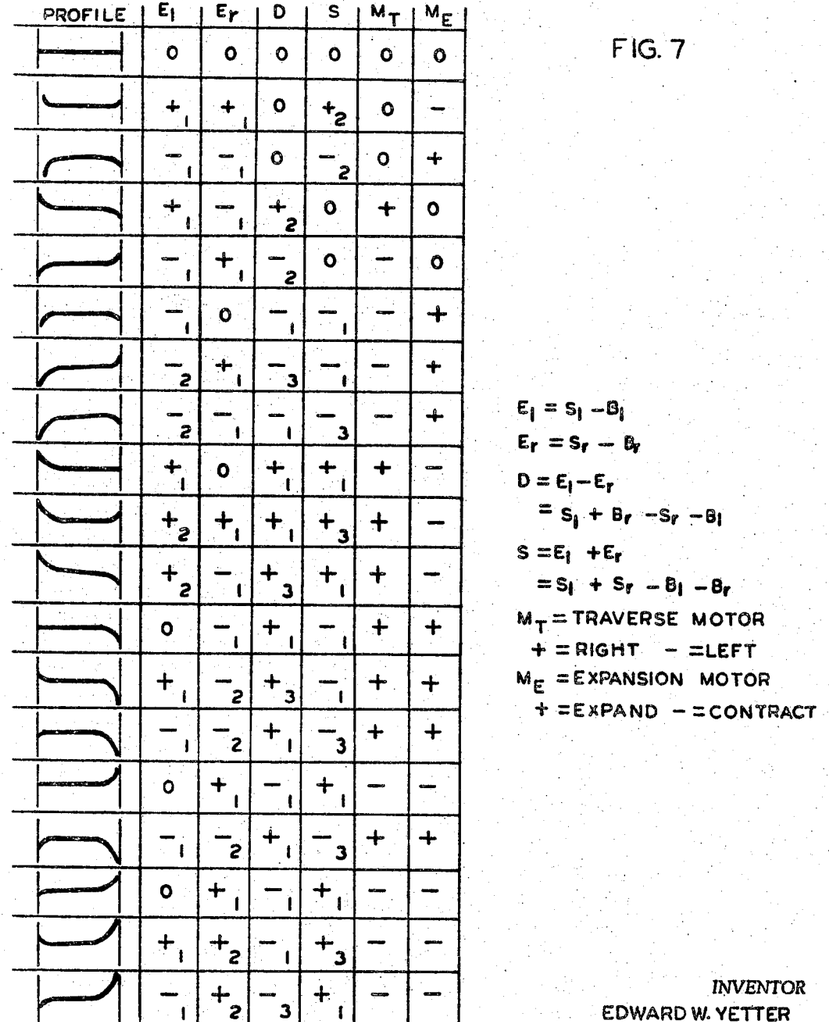
FIG. 7 is a schematic representation of a number of specific yarn beam profile variations shown together with the corresponding error and parameter values and control motor drive signals which are produced by them according to this invention.

FIG. 7, as hereinbefore mentioned, presents a great number of somewhat idealized profiles which result from specific error signals, parameters and clockwise or counter-clockwise beaming motor rotations.

Apparatus constructed in accordance with this invention gave a response, with preliminary proper gain control settings, such that corrections to the beaming process were achieved along a path closely approximating critical damping within 3–4 control cycles.

Referring now to FIG. 6, provision is detailed for the optional superposition of a programmed control on the computation of the parameter S, together with the connection of apparatus for accomplishing this to register 19. A bias advance counter 24 (forwardly operating only, typically 4 bits capacity) is shown, with input consisting of a signal transmitted by line 54 (FIG. 2) occurring at the conclusion of each Sampling Period, which, then, is informationally the same as once for each complete control cycle. Since reset is necessary at operator choice, counter 24 is provided with an assemblage of conventional reset select gates denoted generally at 77, which are manually set. Upon the occurrence of each cycle of bias advance counter 24, an output pulse is transmitted via line 38 to $2^0$ flip-flop of the forward-backward counter of bias register 25, the flip-flops of which are noted at 80 (counter capacity typically 7 bits plus sign, count resolution ½ p.p.s., with alarm not detailed, at ±127 counts). The AND gates 85 required for forward-backward operation are shown only for the left-hand three of the counter stages and are omitted from all others to simplify the representation. Lines 78 and 79, connecting with all of these AND gates are algebraic sign bias advance selectors originating from a manually set control switch (not shown).

Register 25 is provided with a three-section diode matrix C, each section having its own set switch 81 (supplying a D-C voltage from a source 81a similar to source 32), only one section, i.e. that reserved to the second most significant digit, of which is detailed in FIG. 6. The matrix arrangement is such that the left-hand matrix section, reserved to the least significant digit, serves the first three counter stages, whereas a rudimentary matrix (which can be simply a toggle switch) serves the second from the extreme right-hand flip-flop 80, and the extreme right-hand flip-flop is reserved to sign designation solely.

Each matrix section is provided with AND gates 83 for the individual sides of flip-flops 80, ANDING the three matrix section outputs with lines 88 and 89, each of which is provided with its own pushbutton switch, not shown. The purpose of the matrix sections C is to establish a constant initial bias count of preselected magnitude for insertion into register 19 ahead of each control cycle, whereas lines 88 and 89 serve to designate the sign of this initial bias, line 88 being reserved for plus convention designation and line 89 for negative convention designation.

Line 90, connecting through OR gates 84 to the "0" side inputs of flip-flops 80, is provided with a pushbutton switch (not shown) permitting reset of all flip-flops 80 to zero at the operator's option. Line 91 (see also FIG. 1) is the sensed variable signal input to register 19. Finally, it is understood that register 19 is provided with the same overflow inhibit and alarm circuit auxiliaries as hereinbefore described for register 18 (refer FIG. 3), however, the details of these are omitted in FIG. 6.

Prior to the commencement of beaming operation, all flip-flops 80 of the counter of register 25 are reset to zero by depression of the pushbutton switch connected with line 90. Then switches 81 are disposed at particular levels of their matrix C sections, thereby setting the magnitude of the initial bias which it is desired to introduce into register 19. The sign of this initial bias is selected by depressing one or the other of the pushbutton switches to deliver the appropriate AND signal via lines 88 and 89, which thereupon also effects the pre-selected initial bias count introduction into flip-flops 80 without further action on the part of the operator. Finally, switch 33 is closed momentarily on its upper contact, assuring that all flip-flops in the main control apparatus are reset to their zero states.

Next, in order, reset gates 77 are manually set to the count at which it is desired that bias advance counter 24 should reset, which, for the design portrayed, is within the rate range of once per control cycle to once for every sixteen control cycles, corresponding to a rate of increase ratio of 1:16. Then the direction of the count progression within flip-flops 80 is preselected by operation of the permanent set switches connected with lines 78 and 79, the former being arbitrarily reserved to forward operation whereas the latter is reserved to backward operation.

At this point, beaming operation is commenced. At the end of the first control cycle, the signal delivered via line 54 operates AND gates 86 to introduce the initial count (or, alternatively, the initial count plus the first cycle advance) set into the flip-flops 89 of bias register 25 into flip-flops 87 of register 19. It will be seen that only the first four register 19 counter stages, together with the sign designation provided from extreme right-hand flip-flop 87, connect with selector 21, matching the arrangement of register 18 and its responsive selector exactly. The remaining flip-flops 87 are necessary to parameter computation, because the total of counts manipulated with sizable bias incorporation is much greater than that for register 18. However, since the total number of velocity patterns $V_1$ to $V_4$ in the control repertory is the same for both registers 18 and 19, the output magnitudes need only be the same.

At the end of the control cycle, a pulse is delivered via line 54 to bias advance counter 24, which, depending upon the setting of its reset select gates 77, ultimately resets the counter to zero, at the same time delivering a pulse via line 38 to the input of the $2^0$ counter 80. This produces a progressive advance of the counter of bias register 25 in a forward or backward direction as dictated by the switch settings in lines 78 or 79.

Programming control of beaming is especially desirable in two different situations. It is quite often necessary to beam a relatively coarse denier yarn as selvage together with a fine denier yarn as the body yarn. In such a case, a fixed beam profile can be obtained by introducing a fixed bias through appropriate programming.

On the other hand, substantial yarn retraction with either the same denier selvage and body yarn, or different deniers of each, can occur during beaming. This can be compensated for, and a preselected beam profile maintained, by resorting to a progressively advanced programming, under which circumstances the profile can be made to vary linearly with beam diameter in a retraction-compensatory sense.

While the foregoing description has been devoted specifically to yarn beaming, it will be understood that this invention is equally applicable to a wide variety of other processes, such as, by way of example solely, the control of both the incremental and the average thickness of thermoplastic polymeric film during the course of its stretching. In general, processes wherein control depends upon a plurality of mutually effective parameters computed on the basis of a multiplicity of sensed variables are all adapted to regulation by my apparatus.

In yarn beaming satisfactory control is achieved by the use of only two motors, 22 and 23; however, no limitation on the number of power-driven units operative on a process in control is thereby implied. Thus, in the control of thermoplastic polymeric film stretching, it is desirable to effect the stretching by individual motors (typically 20 in number) allocated to separate zones of the running film path.

In this connection, film stretching control is conducted generally as follows: the film is pulled through the stretching apparatus at constant tension while the several zones thereof are exposed to resistance heaters regulated in current supply by the positioning of motor-driven contacts. The thickness of each zone is sensed and corrected by use of a separate control loop reserved to each zone, on the basis of a comparison with an average computed film thickness, $T_{ave}$, hereinafter defined. There is a separate control loop reserved to the control of the average thickness, referred to a set point thickness, $T_0$, hereinafter defined.

Thus, $P_1 \ldots P_n$ are the several parameters relating the average film thickness to the actual thickness of each specific zone. A single parameter, e.g., $P_1$, is defined as $P_1 = T_{ave} - T_1$, where $T_1$ is the sensed film thickness for Zone No. 1. The average thickness, $$T_{ave} = \frac{\Sigma - T_1 \ldots T_n}{n}$$

Velocity patterns are selected in accordance with parameters $P_1 \ldots P_n$ as hereinbefore described, each controlling the speed and direction of rotation of the motor regulating the resistance heater varying the film tensile strength to effect either stretching or relaxing of the film in the particular zone involved. Also, it is necessary to determine yet another parameter $A = T_0 - T_{ave}$, which is employed as basis for the selection of an appropriate velocity pattern controlling the motor driving the polymer supply pump which, responsive thereto, varies the rate of polymer supply introduced to all of the zones collectively.

It will be further understood that there is no limitation on the employment of the analog approach as a basis for application of this invention. Thus, one can readily derive a steady voltage signal proportional to yarn velocity, rather than a pulse, whereupon one can then subtract voltages and obtain a sensed variable result determinative of the parameter serving as the index for velocity pattern selection as hereinbefore taught. Finally, it is practicable to vary the Sampling Period, instead of utilizing one of constant duration, the desideratum here being to limit this part of the cycle to a time duration adequate to give the resolution desired for any given cycle, while devoting the rest of the time to process correction activity.

From the foregoing, it will be understood that this invention is subject to relatively wide modification within the skill of the art without departure from its essential spirit, and this is, accordingly, intended to be limited only be the scope of the appended claims.

What is claimed is:

1. Apparatus for sampled data process control through the agency of jointly effective power-driven apparatus units operative on said process comprising, in combination, means sensing individually a plurality of variables, means computing as a conjoint function of said variables a plurality of parameters characterizing said process, means choosing a process corrective action on the basis of the established value of a specific one of said plurality of parameters in terms of a velocity pattern applicable to a specific one of said power-driven apparatus units operative, in conjunction with at least one other velocity pattern similarly chosen, closest to obtain the desired control response within a predetermined time span consummated prior to the end of the next succeeding sampling-computing interval, and means effectuating control of said process by application of each said velocity pattern to said specific one of said power-driven apparatus units to which it relates.

2. Apparatus for sampled data process control through the agency of jointly effective power-driven apparatus units operative on said process according to claim 1 provided with programming means supplying a preselected term as an additional input to said means computing at least one of said parameters as a conjoint function of said variables, thereby qualifying the computation in a preselected arbitrary manner.

3. Apparatus for sampled data process control through the agency of jointly effective power-driven apparatus units operative on said process according to claim 2 provided with programming means supplying a preselected term as an additional input to said means computing at least one of said parameters as a conjoint function of said variables, thereby qualifying the computation in a preselected arbitrary manner, wherein said programming means consist of means establishing a preselected level equivalent to sensed variable magnitude as a preliminary to the computation of at least one of said plurality of parameters in combination with means changing said preselected level progressively as said process continues in operation.

4. Apparatus for sampled data control of yarn beaming through the agency of a first motor shifting transversely a yarn warp sheet made up of a multiplicity of yarn ends which it is desired to wind on a common beam and a second motor expanding or contracting the width of said yarn warp sheet comprising, in combination, means sensing individually the velocities of a given selvage yarn, $S_l$, a body yarn, $B_l$, disposed in close proximity to said given selvage yarn, the opposite selvage yarn, $S_r$, and a body yarn, $B_r$, disposed in close proximity to said opposite selvage yarn, means computing as a conjoint function of said velocities a difference parameter $D=E_l-E_r$, and a sum parameter $S=E_l+E_r$, where $E_l=S_l-B_l$ and $E_r=S_r-B_r$, means choosing a first beaming process corrective action in terms of a first velocity pattern on the basis of the established value of said parameter D and a second beaming process corrective action in terms of a second velocity pattern on the basis of the established value of said parameter S, and means effectuating control of said yarn beaming by application of said first velocity pattern to said first motor and said second velocity pattern to said second motor.

5. Apparatus for sampled data control of yarn beaming according to claim 4 provided with programming means supplying a preselected bias control term to said means computing as a conjoint function of said velocities said difference parameter $D=E_l-E_r$ and said sum parameter $S=E_l+E_r$.

6. Apparatus for sampled data control of yarn beaming according to claim 4 provided with beam taper control means.

References Cited
UNITED STATES PATENTS 3,109,170   10/1963   Greene et al. ___ 235—150.23 X

FOREIGN PATENTS 722,712   1/1955   Great Britain.

MALCOLM A. MORRISON, *Primary Examiner*

MARTIN P. HARTMAN, *Examiner.*

K. W. DOBYNS, *Assistant Examiner.*